(12) United States Patent
Krietzman et al.

(10) Patent No.: US 11,826,655 B2
(45) Date of Patent: *Nov. 28, 2023

(54) LEVERAGING ONLINE GAME GOALS AND ECONOMY TO DRIVE OFF-LINE BEHAVIORS

(71) Applicants: Mark Krietzman, Palos Verdes Estates, CA (US); Andrew Robinson, Virginia Beach, CA (US)

(72) Inventors: Mark Krietzman, Palos Verdes Estates, CA (US); Andrew Robinson, Virginia Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/857,982

(22) Filed: Jul. 5, 2022

(65) Prior Publication Data

US 2022/0331698 A1 Oct. 20, 2022

Related U.S. Application Data

(63) Continuation of application No. 16/148,915, filed on Oct. 1, 2018, now Pat. No. 11,376,506, which is a continuation of application No. 15/009,773, filed on Jan. 28, 2016, now Pat. No. 10,086,287, which is a continuation of application No. 15/008,447, filed on Jan. 28, 2016, now Pat. No. 10,226,704.

(60) Provisional application No. 63/337,981, filed on May 3, 2022, provisional application No. 62/109,007, filed on Jan. 28, 2015, provisional application No. 62/108,603, filed on Jan. 28, 2015.

(51) Int. Cl.
*A63F 13/69* (2014.01)
*A63F 13/35* (2014.01)
*A63F 13/216* (2014.01)
*A63F 13/92* (2014.01)

(52) U.S. Cl.
CPC ............ *A63F 13/69* (2014.09); *A63F 13/216* (2014.09); *A63F 13/35* (2014.09); *A63F 13/92* (2014.09)

(58) Field of Classification Search
CPC ........ A63F 13/69; A63F 13/216; A63F 13/35; A63F 13/92
USPC .......................................................... 463/31
See application file for complete search history.

(56) References Cited

U.S. PATENT DOCUMENTS

| | | | | |
|---|---|---|---|---|
| 2007/0038559 | A1* | 2/2007 | Jung | G06Q 90/00 715/745 |
| 2009/0070180 | A1* | 3/2009 | Jung | G06Q 40/02 705/38 |
| 2012/0079608 | A1* | 3/2012 | Heatherly | G06Q 30/02 726/30 |
| 2012/0315986 | A1* | 12/2012 | Walling | A63F 13/213 463/31 |
| 2012/0315987 | A1* | 12/2012 | Walling | A63F 13/335 463/31 |
| 2018/0028920 | A1* | 2/2018 | Judkins | A63F 13/73 |

* cited by examiner

*Primary Examiner* — Pierre E Elisca
(74) *Attorney, Agent, or Firm* — Mark H. Krietzman

(57) ABSTRACT

A method and system to leverage non-virtual (or meta world) actions via a gaming analog or infrastructure to encourage actions in said non-virtual environment to achieve virtual or meta world benefits an interface interacts with Gameco servers; Gameco servers provide participant opportunities to acquire virtual world benefits by physical actions such as visiting specific geographic locations or areas within locations and, participant is provided a virtual reward by Gameco.

9 Claims, 7 Drawing Sheets

LEVERAGING ONLINE GAME GOALS AND ECONOMY TO DRIVE OFF-LINE BEHAVIORS

CROSS-REFERENCE TO RELATED APPLICATIONS

The present application claims priority to United States ("U.S.") Provisional Patent Application, Ser. No. 63/337,981, filed on May 3, 2022, and titled "LEVERAGING ONLINE GAME GOALS AND ECONOMY TO DRIVE OFF-LINE BEHAVIORS," which is herein incorporated by reference in its entirety.

This application also claims priority to U.S. patent application Ser. No. 16/148,915, filed on Oct. 1, 2018, and titled "LEVERAGING ONLINE GAME GOALS AND ECONOMY TO DRIVE OFF-LINE," which is a continuation of U.S. patent application Ser. No. 15/009,773, filed Jan. 28, 2016, and titled "LEVERAGING ONLINE GAME GOALS AND ECONOMY TO REWARD BETTER REAL WORLD BEHAVIORS," which claimed the benefit of U.S. Provisional Patent Application, Ser. No. 62/109,007, filed Jan. 28, 2015, wherein both applications are incorporated by reference herein in their entirety.

This application also claims priority to U.S. patent application Ser. No. 15/008,447, filed Jan. 28, 2016, and entitled "LEVERAGING ONLINE GAME GOALS AND ECONOMY TO DRIVE OFF-LINE BEHAVIORS," which claimed the benefit of U.S. Patent Application, Ser. No. 62/108,603, filed Jan. 28, 2015, wherein both applications are incorporated by reference herein in their entirety.

BACKGROUND

1. Field

The present disclosure relates generally to a method and system to drive game player choices and actions in real world settings to achieve virtual world benefits.

2. Related Art

Online and mobile gaming in a virtual world is well known as our first-person role-playing games (RPG). In 2014 online gaming was estimated as a 40 billion USD industry. As such, online gaming contributes significantly to the US economy. At present, a virtual world known generally as the meta world, meta verse, or metaverse (herein generally referred to as a virtual world) is emerging which may technology companies starting to offer different services in the virtual world as more and more people attempt to establish a digital virtual presence in this virtual world.

Today some believe that the grown in the use of virtual reality devices may lead to improvement in coordination, vision and problem solving thorough the use of properly created virtual environments and immersive games. Unfortunately, many health experts and others in society are concerned that excessive immersion by people in digital environment such as high use of the Internet for website surfing, social media, entertainment such as streaming and online gaming, and the use of virtual reality devices to interact with the growing virtual world has been identified as a possible cause of fatigue, obesity, reclusion, and possibly other mental issues. Others note improvement in coordination, vision and problem solving may be associated with immersive gaming.

SUMMARY

Disclosed is a method and system to leverage non-virtual (or meta world) actions via a gaming analog or infrastructure to encourage actions in said non-virtual environment to achieve virtual or meta world benefits an interface interacts with Gameco servers; Gameco servers provide participant opportunities to acquire virtual world benefits by physical actions such as visiting specific geographic locations or areas within locations and, participant is provided a virtual reward by Gameco.

The present disclosure relates generally to a method and system to drive game player choices and actions in real world settings to achieve virtual world benefits.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

In the Figures, like reference numerals designate corresponding parts throughout the different views. All callouts and annotations are hereby incorporated by this reference as if fully set forth herein.

DETAILED DESCRIPTION

Figure 1:
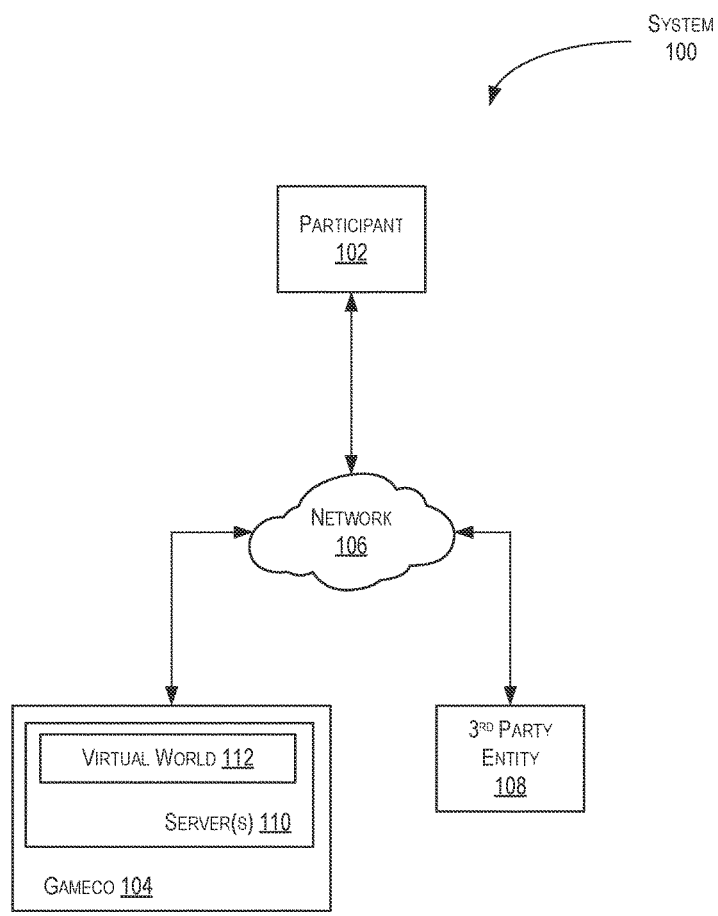
FIG. 1 is a system block diagram of an example of an implementation of system for providing a virtual world for a participant user in accordance with the present disclosure.

Disclosed herein are systems and methods to encourage and/or direct actions and accomplishments in the non-virtual world visa via the goal of obtaining virtual world benefits, including but not limited to points, online game characters, accouterments, items, level-ups, advantages, prestige, fame, accolades, and collectables.

Aspect of the methods and systems disclosed herein include the support for and/or promotion by Gameco of real world (non-virtual) positive conduct. Online gaming and gaming in general have been vilified by many for the seemingly habitual nature of some game environments to some persons. A method whereby Gameco encourages non-virtual world activities, and in particular positive activities, is a powerful tool to combat misperceptions about online gaming.

Aspects of the methods and systems disclosed herein include support for and/or promotion of combining online or virtual world activities with engagement of the real (non-virtual) world.

Aspects of the methods and systems disclosed herein include support for and/or promotion of local brick and mortar businesses and the related economies by combining online or virtual world activities with engagement of the real (non-virtual) world.

Aspects of the methods and systems disclosed herein include leveraging a gaming infrastructure to encourage actions in a non-virtual environment to achieve virtual world benefits, the method comprising: participant has an account or identity on Gameco servers; application interacts with Gameco servers; Gameco servers provide participant opportunities to acquire virtual world benefits by visiting specific geographic locations which may include businesses; participants visits specified location; and, participant is provided a virtual reward by Gameco.

Aspects of the methods and systems disclosed herein include leveraging a gaming infrastructure to encourage actions in a non-virtual environment to achieve virtual world benefits, the method comprising: participant has an account or identity on Gameco servers; Gameco servers monitor participants activities via permitted image capture, biometric or tag associated with participant. Gameco servers reward participant with world benefits by participants real world activities such as visiting geographic locations which identify participant.

Aspects of the methods and systems disclosed herein include leveraging a gaming infrastructure to encourage actions in a non-virtual environment to achieve virtual world benefits, the method comprising: a participant using a computing device logs on to an application or website which communicates with Gameco servers; from time to time Gameco servers contact the participant via the computing device to give notice of an opportunity to achieve virtual rewards in a gaming environment or virtual world via going to a location and performing some action in the real world; if the participant choses to meet the opportunity then he/she is identified at the location via location servers; Gameco servers then verify participant; and, Gameco servers determine if opportunity has been met and award virtual reward to participant. In some instances, servers decisioning that additional opportunities exist for a specific participant at or near a specific location and Gameco notifies participant of the opportunity. In some instances, Gameco servers contact client servers and request payment for virtual reward provided to participant.

Aspects of the methods and systems disclosed herein include identify location by placement of a visual image (QR Code) in the real world that is unique to that location and or event. Graphic image could be placed so that a digital camera captures QR code and picture image and sends a code to Gameco's servers identifying the location and or the event. In some instances, Gameco servers electronically "watermarks" photograph taken with QR code information. In addition, this image is watermarked with time and geo information from the digital camera. In some in stances Gameco servers then insert image in virtual environment so that it is available when user enters the virtual environment.

In some instances verifying the participation includes placement of a visual image or QR Code in the real world at the location which is unique to that location and or event. Graphic image could be placed so that a digital camera captures QR code and picture image and sends a code to Gameco's servers identifying the location and or the event. In some instance Gameco servers electronically watermark an image taken with QR code information and at least one of time and geo location information. In some instances Gameco servers insert the water marked image in virtual environment or a portion of a virtual environment and said water marked image is visible or displayed. In some instances the water marked image is only visible or displayed in the virtual environment or a portion thereof when the participant associated with the watermarked image is in the virtual environment or portion thereof. In some instances water marked image is only visible or displayed in the virtual environment or a portion thereof for one of a fixed or variable time or date.

Aspects of the methods and systems disclosed herein include leveraging a gaming infrastructure to encourage actions in a non-virtual environment to achieve virtual world rewards or items of desire, the method includes a participant using a computing device receive a notice from Gameco servers of an opportunity to act and achieve a virtual reward or benefit through actions outside of interacting with his/her computing device; participant selects an opportunity and performs an action in the real world; the participants is verified or confirmed as performing the activity by at least one of participants computing device and computing devices at client locations; Gameco servers then verify participant; and, Gameco servers determine if opportunity has been fulfilled and award virtual reward to participant. In some instances the method further comprising Gameco servers decisioning that additional opportunities exist for a specific participant at or near a specific location and Gameco notifies participant of the opportunity. In some instances Gameco servers and request payment for virtual reward for participant's activity. In some instances participant via computing device confirms to Gameco servers that he/she will chose an opportunity to act and Gameco servers record the confirmation. In some instances Gameco servers offer participant an enhanced or increased reward for making the confirmation after the participant completes the activity.

Aspects of the methods and systems disclosed herein include leveraging a gaming infrastructure to encourage commercial purchases in a non-virtual environment, the method includes a client contacts Gameco and agrees on an offer of virtual world benefits or rewards to be awarded participants in an online game for performing activities in a real world; Gameco servers populate the offer via a notification to the computing devices of at least some of the participants in the online game; if a participant performs the activity at any threshold level required a reward in the virtual game world is provided; and client pays Gameco for providing the virtual reward.

Aspects of the methods and systems disclosed herein include leveraging a gaming infrastructure to encourage commercial purchases in a non-virtual environment, the method includes a client contacts Gameco and agrees on an offer of virtual world benefits or rewards to be awarded participants in an online game for performing activities in a real world; Gameco servers populate the offer via a notification to the computing devices of at least some of the participants in the online game; and client pays Gameco for providing the notification.

The computing devices/smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

A scenario is established between a Gameco and one or more participants via computing devices in signal communication and clients who seek to utilize the online system as a mechanism to drive off-line activity.

Real world actions are actions beyond touching a keyboard, or mouse or touch screen to "surf" or use a computing device or interface to interact with websites or apps. Real world actions mean going somewhere and doing something physical that is not simply interacting with a computing device. However, part of the real-world action may include using the computing device to receive notices, to authenticate and verify the activity or a part thereof.

In some exemplary implementations the off-line activity includes commercial behaviors such as shopping, traveling to a particular location. Behavior or action may be required or desired within a particular time frame. In some instances, the virtual world reward (or value) associated with a behavior by the participant may be fixed. In some instances, the virtual world reward (or value) associated with a behavior by the participant may be dynamic and change as a function of supply, demand, subsidy, sponsorship and the like. The commercial value to Gameco can be a function of the demand of clients. The commercial value to Gameco may in some instances be generally approximated by the difference between the online purchases of upgrades by participants who do not participate in off-line behavior to ear virtual world benefits versus those who do. The commercial value to Gameco may in some instances be generally approximated by the difference between the online purchases of upgrades by participants who do not participate in off-line behavior to earn virtual world benefits versus those who do plus advertising/marketing fees paid to Gameco for leveraging its infrastructure to drive behavior for clients. The commercial value to Gameco may in some instances be generally approximated by the difference between the online purchases of upgrades by participants who do not participate in off-line behavior to earn virtual world benefits versus those who do plus subsidies paid by clients to Gameco for the virtual benefits it distributes to drive behavior for clients.

In some exemplary implementations the valuation methodology may also be part of a auction like system wherein clients compete, in some instances, for participant behaviors they desire by outbidding a different client for Gameco to motivate via the on line environment.

Off-line activities may also be dynamic such as real-world actions. Real world actions refer generally to actions that a participant completes in a non-virtual world environment and without interacting directly with the Gameco servers. Participant actions while interacting with the Gameco servers even the result of physical acts by the participant are not the non-virtual world actions referred to herein.

The scenario is beneficial to the participant as she/he is motivated by the opportunity to obtain a virtual world reward by spending some time in the non-virtual world including but not limited to travel, supporting local businesses, purchases, service (such as helping a political party get out vote) and the like.

Gameco derives revenue by linking one or more funding sources or subsidizers to its servers wherein actions or goals obtained by participants which earn participants rewards are paid for by such sources. Additionally, when participants activities i.e. visiting ABC sandwich shop is via the opportunity presented by Gameco, Gameco may also receive a percentage of the revenue collected by the "ABC" sandwich shop visa vie authentication of the participant by Gameco servers and in some instances assigning benefit and reward to participant after receiving confirmation of purchases via client servers. In some instance the participant's computing device (such as a parent or guardian) may hold the master account for a child wherein the computing device for the parent interacts with the ecosystem but earns rewards for the child's identified, specified or linked account at Gameco servers.

Gameco also obtains a positive impression in the society by actively offering opportunities to have participants spend some amount of time in a non-virtual world.

At a simplified level aspects of the system and method disclosed herein include utilizing hardware referred to as computing or smart devices which may include internet streaming systems, gaming system, desktop computers, laptops, tablets, smart phones, televisions to acquire, receive, measure or otherwise capture and then transmit via signal communication data associated with a participant.

FIG. 1 is a system block diagram of an example of an implementation of system 100 for providing a virtual world for a participant user 102 (herein referred to a "participant") in accordance with the present disclosure. The system 100 includes a Gameco 104, a network 106, the user 102, and a third-party entity 108. The network 106 may be any computer based network such as, for example, the Internet, and is in signal communication with the Gameco 104, the user 102, and the third-party entity 108. The Gameco 104 may include one or more servers 110 (also referred to interchangeably herein as Gameco servers 110) that include one or more processors. When in operation, the Gameco 104 may run and maintain a virtual world 112 (also interchangeably referred to as a "meta world") on the one or more servers 110. In this example, the participant 102 is a person that desires to use and interact with the virtual world 112 of the Gameco 104. The third-party entity 108 is a business organization that desires to either interact with, receive information about, and/or advertise to the participant 102. The Gameco 104 is a business organization that runs and maintains the virtual world 112 that may be either a closed virtual "universe" or part of a larger virtual world/universe such as the "metaverse," where the metaverse may be an iteration of the Internet as a single, universal and immersive virtual world that is facilitated by the use of virtual reality (VR) and augmented reality (AR) headsets.

In this example, the metaverse may be a network of three-dimensional virtual worlds focused on social connection where the metaverse is generally a cyberspace that may include a virtual reality, which is characterized by persistent virtual worlds that continue to exist even when the participant 102 is not interacting with the virtual worlds, and an augmented reality that combines aspects of the digital and physical worlds. At present, online game companies have already implemented components of metaverse technology within some known video games. Other known companies have also implemented components of metaverse technology into three-dimensional virtual worlds that incorporate aspect of social media where user (such as the participant 102) are represented as avatars within the virtual worlds. In this example, Gameco 104 may be an online gaming company or other type of online company that allows the participant 102 to interact with the virtual world 112. As an example, Gameco 104 may be a business that utilizes the virtual world 112 for online gaming, work productivity, interactive learning environments, e-commerce, real estate advertising and transactions, and fashion.

As discussed earlier, the third-party entity 108 is a business organization that desires to either interact with, receive information about, and/or advertise to the participant 102. In this example, the third-party entity 108 may be a business entity that has real-world physical facilities or equipment that can be visited or used in combination with corresponding activities in the virtual world 112. In this example, the third-party entity 108 may communicate virtually with the Gameco 104 via the network 106. These communications may include requests to receive information about the participant 102 or provide the participate 102 with activities or advertisement from the third-party entity 108. In response to these communications, Gameco 104 may modify aspects of the virtual world 112, with the one or more servers 110, to accommodate the requests from the third-party entity 108. As a business transaction, the third-party entity 108 may compensate the Gameco 104 for these services.

Figure 2:
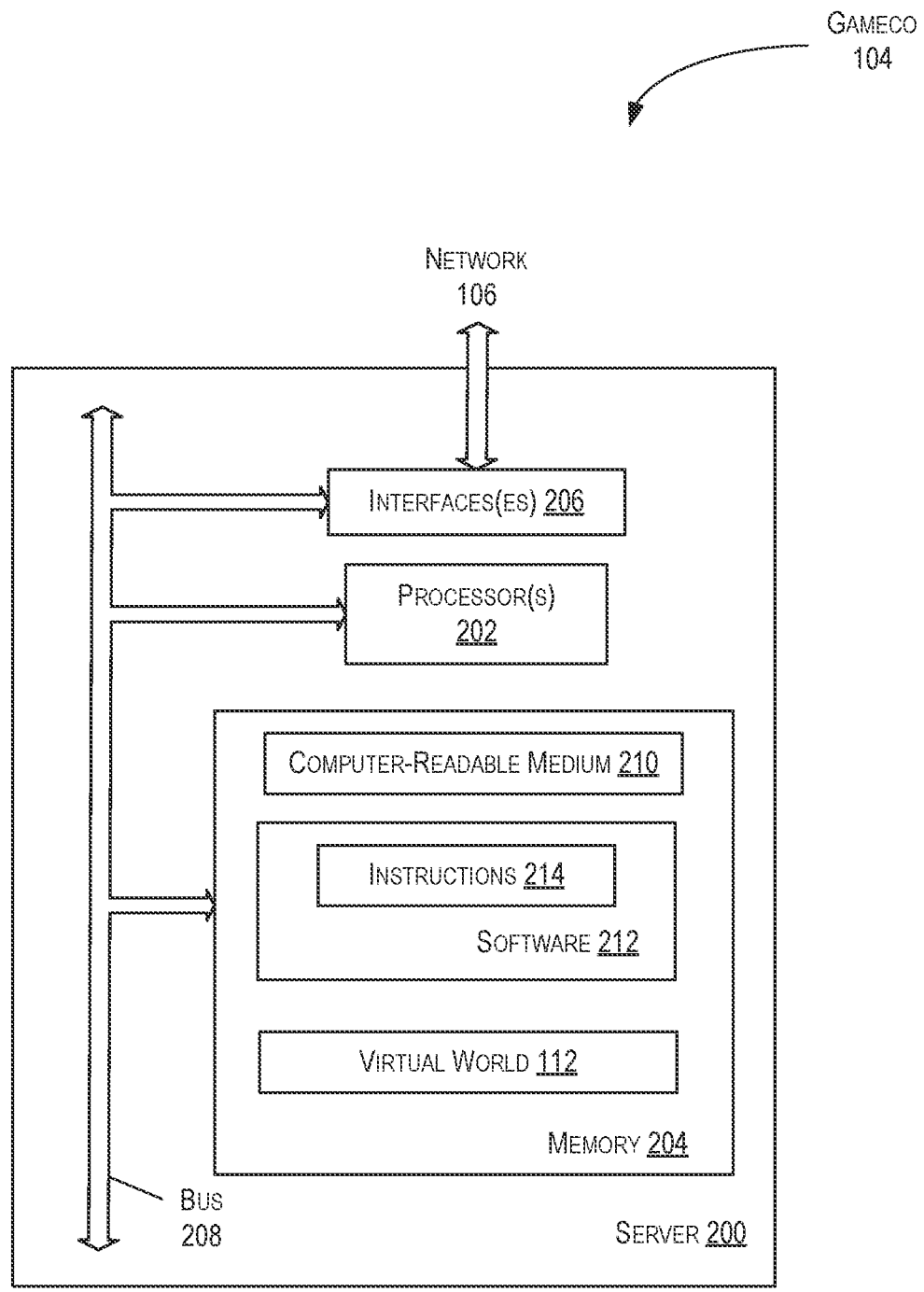
FIG. 2 is a system block diagram is shown of an example of an implementation of a server of the one or more servers of the Gameco in accordance with the present disclosure.

In FIG. 2, a system block diagram is shown of an example of an implementation of a server 200 of the one or more servers 110 of the Gameco 104 in accordance with the present disclosure. The server 200 includes one and more processors 202, a memory 204, one or more interfaces 206, and a system bus 208. The memory 204 may include a computer readable medium 210 and software 212. The software 212 may include instructions 214 that are configured to control the one or more processors 202. In this example, the server 200 runs and maintains the virtual world 112 which may be run on the memory 204. The memory 204 may include one or more separate memory or storage devices that are configured to operate together. In this example, the system bus 208 is in signal communication with the one or more processors 202, the memory 204, and the one or more interfaces 206. In this example, the one or more interfaces 206 is in signal communication with the network 106.

In these examples, the network 106 may be one or more telecommunication networks that may include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. The network 106 may utilize communications protocols, including packet-based and/or datagram-based protocols such as IP, transmission control protocol ("TCP"), user datagram protocol ("UDP"), or other types of protocols. Moreover, the network 106 may also include a number of devices that facilitate network communications and/or form a hardware basis for the networks, such as switches, routers, gateways, access points, firewalls, base stations, repeaters, backbone devices, and the like.

In some examples, the server 200 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 902.11 standards (e.g., 902.11g, 902.11n, and so forth), and other standards.

In this example, the server 200 may be a personal computer, portable computer, server, etc. In general, the server 200 may include one or more computing devices that operate in a cluster or other grouped configuration to share resources, balance load, increase performance, provide failover support or redundancy, or for other purposes. For instance, the computing server 200 may belong to a variety of classes of devices such as traditional server-type devices, desktop computer-type devices, and/or mobile-type devices.

In some implementations, the server 200 includes one or more input/output ("I/O") interfaces 206 that enable communications with input/output devices including peripheral input devices (e.g., a keyboard, a mouse, a pen, a voice input device, a touch input device, a gestural input device, and the like) and/or output devices including peripheral output devices (e.g., a display, a printer, audio speakers, a haptic output device, and the like). The server 200 may also include a combination of two or more devices.

The server 200 may represent any type of computing device having the one or more processing units 202 (also known as one or more processors) in signal communication to the computer-readable media 210 via the system bus 208, which in some instances may include one or more of a system bus, a data bus, an address bus, a PCI bus, a Mini-PCI bus, and any variety of local, peripheral, and/or independent buses. Executable instructions 214 stored on the computer-readable media 210 can include, for example, an operating system, a client communication module, a profile module, and other modules, programs, or applications that are loadable and executable by the one or more processing units.

Figure 3:
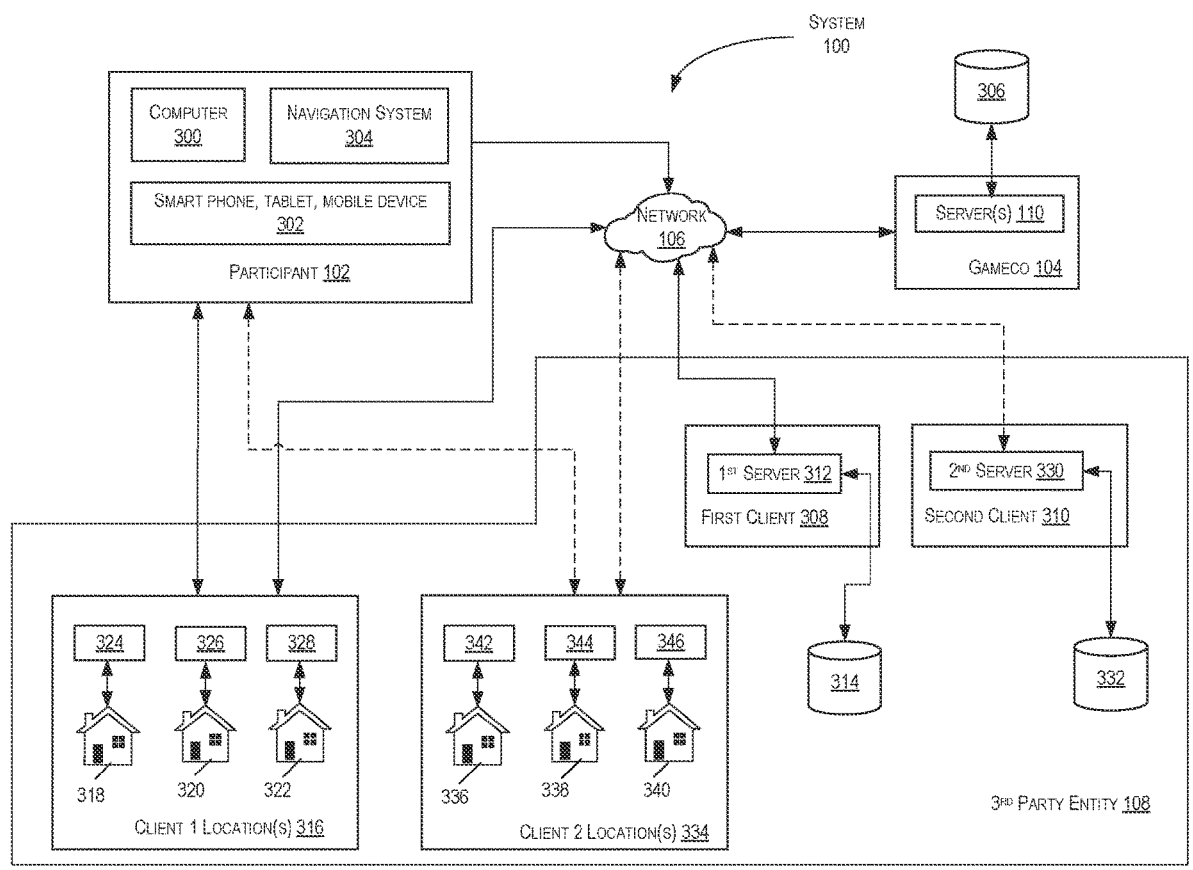
FIG. 3 is a system block diagram is shown of the implementation of the system showing greater detail in accordance with the present disclosure.

In FIG. 3, a system block diagram is shown of the implementation of the system 100 showing greater detail in accordance with the present disclosure. In this example, the participant 102 may utilize one or more computing devices that include, for example, a computer system 300, smart phone, tablet, or other mobile device 302, and a navigation system 304 in signal communication with one or more services 110 of the Gameco 104 via the network 106. In this example, the Gameco 104 one or more servers 110 are in signal communication with one or more databases 306, where information is stored.

In an example of operation, the participant 102 either sets up an account at the one or more servers 110 of the Gameco 104 or the one or more servers 110 capture information from the computing device 300, 304, or 306 (including but not limited to MAC address, IP address, serial number, geolocation, phone number, vehicle identification number, synthetic GPS, Cell ID, Wi-Fi, Terrestrial Transmitters) of the participant 110 to identify the participant 102, which may include the location thereof and create records about the participant 102. The communication may be intermittent and the participant 102 may utilize an application on the computing device 300, 304, or 306 and that application is in signal communication and intermittent contact with one or more servers 110 of the Gameco 104.

In this example, the third-party entity 108 may be at least one client (i.e., first client 308). For purposes of illustration the third-party entity 108 may include a plurality of clients including, for example, the first client 308 and a second client 310. It is appreciated by those of ordinary skill that additional clients may also be included.

In an example of operation with just one client (i.e., first client 308), Gameco 104 is in signal communication with the first client 308 via a first client server 312. In this example, one or more servers 110 are in signal communication with the first client server 314 (which may be one or more servers) where Gameco's 104 rule and decision engines in the one or more servers 110 are scheduled with parameters of the first client 308 to control, or at least influence the behavior of the participant 102 with the desired parameters from the first client 308. This determines what segment, if not all, of Gameco's 104 population of participants (including participant 102) are to be broadcast or pushed with messaging to attempt to motivate the participant's 102 behavior outside the virtual/gaming world interaction whereby the participant 102 can achieve benefits in the virtual world for such real-world actions. In this example, the first server 312 is in signal communication with either a local or remote storage device 314. In this example, the first client 308 may be a business entity that include one or more real-world locations 316. In this example, the one or more real-world locations 316 may be as large as a geographic region or as small as one or more stores 318, 320, and 322 have one or more corresponding servers 324, 326, and 328 which are in signal communication with the first client server 312, one or more servers 110 of Gameco 104, and participants 102 computing device 300, 302, or 304. In this example, the first client server 312 may provide all or some of their stored data (in database 314) on sales, customer traffic, inventory, demographic of their customers, zip codes, and traffic flow during time periods to one or more servers 110 of Gameco 104 where the one or more servers 110 determine and identify opportunities to motivate participants (such as participant 102) to interact with first client's 308 real-world locations 316 in general and specific ways.

Similarly, if the second client 310 is present in the third-party entity 108, Gameco 104 is in signal communication with the second client 310 via a second client server 330. In an example of operation with the second client 310, the one or more servers 110 are in signal communication with the second client server 330 (which may be one or more servers) where Gameco's 104 rule and decision engines in the one or more servers 110 are scheduled with parameters of the second client 310 to control, or at least influence the behavior of the participant 102 with the desired parameters from the second client 310. This determines what segment, if not all, of Gameco's 104 population of participants (including participant 102) are to be broadcast or pushed with messaging to attempt to motivate the participant's 102 behavior outside the virtual/gaming world interaction whereby the participant 102 can achieve benefits in the virtual world for such real-world actions. In this example, the second server 330 is in signal communication with either a local or remote storage device 332. In this example, the second client 310 may be a business entity that include one or more real-world locations 334. In this example, the one or more real-world locations 334 may be as large as a geographic region or as small as one or more stores 336, 338, and 340 have one or more corresponding servers 342, 344, and 346 which are in signal communication with the second client server 330, one or more servers 110 of the Gameco 104, and participants 102 computing device 300, 302, or 304. In this example, the second client server 330 may provide all or some of their stored data (in database 332) on sales, customer traffic, inventory, demographic of their customers, zip codes, and traffic flow during time periods to one or more servers 110 of Gameco 104 where the one or more servers 110 determine and identify opportunities to motivate participants (such as participant 102) to interact with second client's 330 real-world locations 334 in general and specific ways.

Gameco's 104 one or more servers 110 act to inform, motivate, urge some population of participants to behave in a desired way in response to Gameco 104 activities on behalf of a (in this example either first client 308 or second client 310. As an example, the behavior may be a real-world travel to a real-world location (i.e., first client location 316 or second client location 334) or purchases at real-world locations.

In either example, the one or more servers 110 of Gameco 104 require authentication of participant's 102 behavior to provide the participant 102 a virtual world benefit for the behavior. A non-exclusive list of authentication means include voice recognition at a client's location via a client's server. Facial recognition via a client's server or other biometric authentication via a client severs. Another authentication means includes obtaining a participant's 102 geolocation via participant's 102 computing device 300, 302, or 304. Still another authentication means includes a changing image such as a clock, glyph, code or the like displayed at client and taken with participant's 102 computing device 300, 302, or 304 to compare the image and its encoded data (i.e. time, glyph code, including but not limited to bar codes, QR codes, audio and the like) with participant's 102 geolocation and computing device identity to validate. In other examples, a participant's 102 image, an affixed tag such as an RFID or other biometric is a means to validate. A specific code is provided for a participant 102 when he/she visits or checks in at a real-world location, which may be a client location 316 or 334. As another example, when a participant 102 makes a purchase at the location (such as client locations 300 or 334), if the participant's 102 computing device (or the participant 102) can provide the client servers 312 or 330 with authentication data, the Gameco 104 one or more servers 110 have a record of participant's 102 purchase. As an example, when visiting an historical site, natural habitat, place of interest like a gallery, or museum on-site computing devices can communicate with participant's 102 computing device 300, 302, or 304 to authenticate the participant 102. The geolocation purchase may trigger one or more benefits or rewards offered to participant 102 for reaching the location (i.e., 316 or 334) or making the purchase; and/or collect subsidy or payment from client to at least one of participant 102 and Gameco 104 for participant's 102 behavior at the location (i.e., 316 or 334).

In another example of an implementation, multiple participants in the real-world who come into close proximity and have been identified in close proximity to one another may as a virtual world reward be rewarded for coming together in the real-world and become, or be invited, to become part of a group, population, gang or posse in the meta world. Gameco's 104 one or more servers 110 can populate participants (e.g., participant 102) directly into a virtual location together. That virtual location may be generally an equivalent of the real-world. For example, if participants were at a casino, they may continue at a corresponding analog casino in the virtual world. The analog may be in a virtual environment such as, for example, on an airship or undersea or on Mars.

In some instances, the group of participants in proximity of a location (i.e., client locations 316 or 334) is time stamped and only the participants that have been time stamp are then permitted to be together at the analog in the meta world together. In some instances, the time participants together at the location (i.e., client locations 316 or 334) are witnessed by their computing devices as an additional or alternative verification of the real-world activity. The time stamp may span the range for very short (seconds) to very long days, weeks or months and all hours, minutes between. The time stamp may also be a time range and a date range where participants who are at the location (i.e., client locations 316 or 334) at a time range, which could be short (seconds, minutes, or hours), during selected calendar days may be permitted to be at the analog meta world location together. Another example is members of a church who attend a service together and are authenticated are invited to, or allowed to, attend together at the meta world church.

In another example, participants coming together in a real-world location or site and being validated or meeting a threshold activity may earn the virtual reward of VIP access to virtual world locations or events. If in the real-world, the participant 102 buys orchestra pit seating at a concert, a circus, or a performance, the participant 102 earns a virtual reward for that preferred location in a virtual world analog. If the participant 102 goes to a real-world location (i.e., first client location 316 or second client location 334) and sits in a particular car (i.e., a vehicle) and tries on designer or branded clothes, jewelry, shoes, or accessories and is validated by a reporting server to Gameco servers 110, the Gameco assigns rewards to the participant 102. As an example, the participant 102 may be rewarded with a NFT or a crypto currency.

In another example, the participant's 102 reward for meeting the activity threshold is to achieve the use of the vehicle or branded clothes or accessories in the virtual world. Optionally, the virtual vehicle or branded products are sponsored products for which the real-world owners of the brands or associated intellectual property receive a royalty from Gameco 104 for permitting the use of the branded virtual product as a reward in the meta world and the use of which may be limited in duration, or location. Optionally, the real-world owners of the brands or associated intellectual property are a source of funds for Gameco 104 providing the branded virtual product as a reward in the meta world and the use of which may be limited in duration, or location. The brand owners are optionally using Gameco's 104 platform for marketing to participants (e.g., participant 102) who needs to interact with real-world products to have meta world use of the same.

In another example, attendees at different locations (e.g., first client location 316 and second client location 334) for a religious or non-religious institution, if they meet the time or date criteria when verified may be allowed to attend a single analog location in the meta world wherein they are brought together in the same venue although they were verified at a "franchise" or satellite location of the institution.

Figure 4:
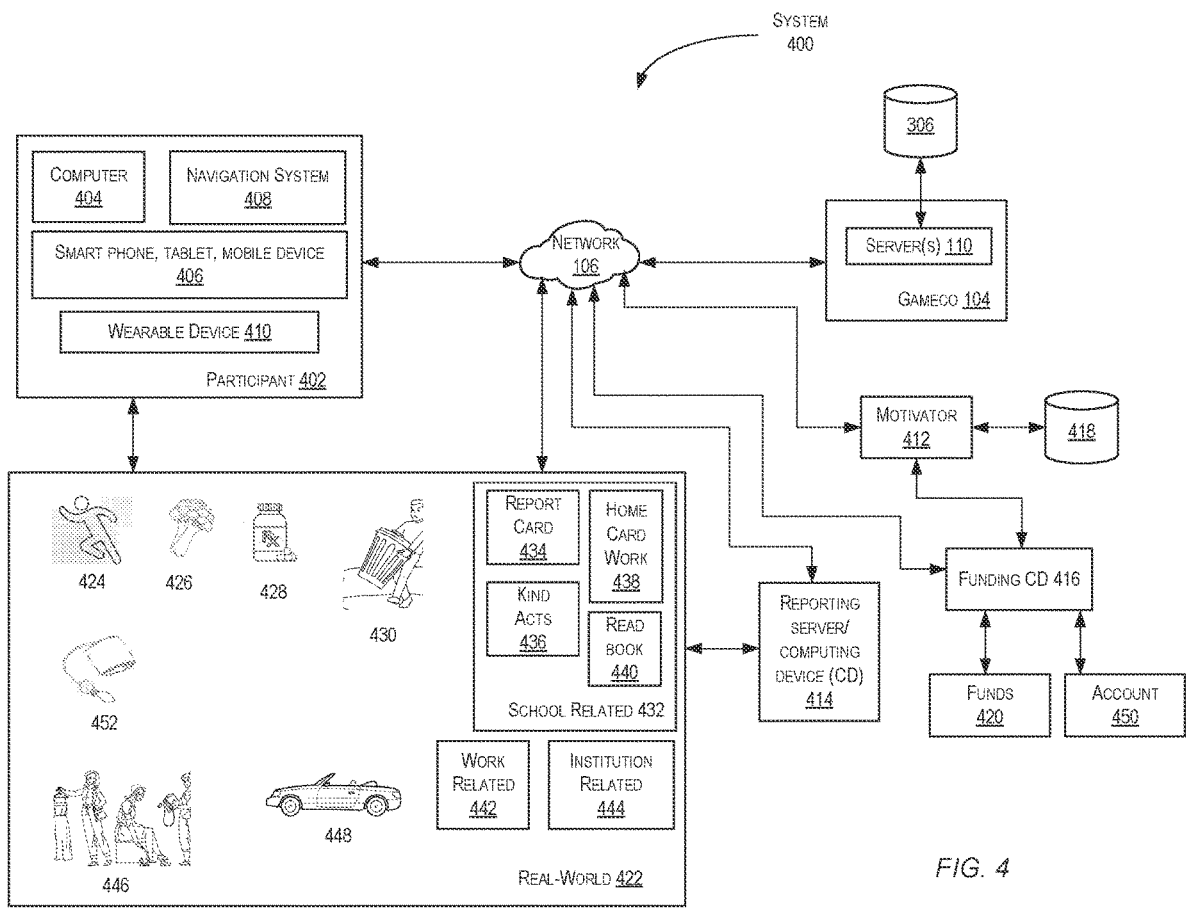
FIG. 4 is a system block diagram is shown of another example of an implementation of a system for providing a virtual world for the participant in accordance with the present disclosure.

In FIG. 4, a system block diagram is shown of another example of an implementation of a system 400 for providing a virtual world for the participant 402 in accordance with the present disclosure. In this example, the participant 402 may utilize one or more computing devices such as, for example, a computer system 404, a smart phone, tablet, or mobile device 406, navigation system 408, and wearable device 410 in signal communication with a computing device and/or Gameco 104 and Gameco servers 110 via a network 106.

In this example, the system 400 includes the participant 402, Gameco 104, the network 106, a MOTIVATOR 412, a reporting server/computing device (CD) 414, a funding CD 416, a database 418, and funds 420 (also known as a funding source). In this example, the MOTIVATOR 412 may be the participant 402, a parent, friend, spouse, teacher, school, employer or the like who are promoting or supporting participant's 402 positive, good and/or healthy choices and actions. As an example, the MOTIVATOR 412 may be a commercial entity, a medical or health entity, a governmental entity that is subsidizing or sponsoring good choice activities and healthy positive actions.

The MOTIVATOR 412 may be a robotic or autonomous programs or semi-autonomous carrying out instructions based on preferences. The MOTIVATOR 412 may also include servers that also may provide all or some of their stored data it has in its database 418 on the participant 402 such as records effecting choices or results the participant 402 has made or achieved which may include grades, turning in homework, going to a gym, medical measurements, food choice, compliance with health or medical needs where Gameco servers 110 receive, collect, parse, develop or record threshold levels of real-world activity or types of activity participant needs to accomplish to earn virtual rewards. The actives may be very specific and targeted to even a single participant based on the goals set. One or more of the participants or some a funding source 420 can utilize a computing device to provide Gameco servers 110 a payment such as crypto currency, bitcoin, currency, NFT, debit card, credit card or linked bank account to pay for or subsidize any earned virtual reward.

Visa vie an application installed on the participant's 402 computing device, linked device or interaction of the participant 402 via a computing device at a location 316 or 334 with Gameco's 104 website and servers 110, the participant 402 receives notifications or reminders of activities he/she can perform in the real-world to earn virtual world benefits. The activities may be geo-linked, where if the participant 402 is at the gym, or a restaurant school he/she may receive a notification of activities he/she can act upon that are specific to the school, or home, or work environment. The participation may be both geo-linked to a location and require the presence of additional participants. In some instances, specific participants may be required to be at the geo-location at the specified time to meet a threshold activity which earns a virtual world reward.

The participant 402 may also chose to check in via his/her computing device at a location such as school, work or gym wherein he/she is providing the Gameco servers 110 data on actions or requesting that the location servers provide the data where the Gameco servers 110 are advised of the identity of the participant 402 engaged in the activity. At school and for graded work or test results, a school computerized grade systems can be linked via parent to Gameco 104 to compare result and determine if a threshold activity was met. If a threshold is met, then a reward may be given. As an example, a parent can set account with funds to pay for reward if the servers/system establishes threshold met. In some instances, funding may be subsidized by a school, work, or via advertiser. For children, a parent's computing device may be a verification server/system.

As an example, the participant 402, when acting in the real-world 422, can meet threshold levels of activity or actions to earn benefits and virtual world rewards. For example, these activities may include exercise 424, health food choices 426, medication compliance 428, and chores 430. The activities may also be school related 432 that include grade, test, or performance reports 434 at a threshold level, or kind acts (as reported or observed) 436, turning in homework on time 438, or things like reading a book 440. Other actions or activities may be outside of school, but job related such as an employee at work 442, where the employee (i.e., participant 402) is on time, or does a good job and instead of getting an employee of the week button he/she will receive a virtual reward which may also be subsidized or paid for by the employer. Other activities may be institution related 444. In some instances, the real-world 422 activity may be trying on clothes or accessories 446 or test driving or viewing a vehicle 448 or other durable goods.

Activities of the participant 402 is reported to Gameco servers 110 via the reporting server 414 via the network 106. If the Gameco servers 110 determine that the participant's 402 activities have met the threshold level, then the Gameco 104 can verify and authorize the funding/payment via funding CD 416 and notify participant 402 of the obtainment of a virtual reward.

It is preferred that the participant 402 is authenticated by the Gameco servers 110 when he/she acts to provide participant 402 a virtual world benefit for the behavior. A non-exclusive list of authentication means include, voice recognition at a location via a server, facial recognition, other biometric authentication, and geolocation via participant's 402 computing device. In this example, data collection devices can also verify participant actions to Gameco servers 110.

In this example, the participant 402 who may use one or more computing devices such as the computer system 404, smart phone, tablet, mobile device 406, navigation system 408 such as, for example, a car navigator system, and the wearable device 410. All of these computing devices are in signal communication with the reporting server CD 414 and/or Gameco 104 and Gameco servers 110 via the network 106. In this example, the wearable device 410 may be attached to any part of the body, or clothing of the participant 402 and have sensors to monitor some health aspects such as, for example, steps, climb, heart rate, location. In this example, the Gameco servers 110 are shown connected to one or more databases 306 where information is stored. In this example, the participant 402 may set up an account at Gameco servers 110.

In an example of operation, the Gameco 104 communicates with at least one MOTIVATOR (e.g., MOTIVATOR 412) visa vie a computing device. Gameco's 104 rule and decision engines set-up, schedule, determine, suggest and the like the parameters of MOTIVATOR's 412 desired participant 402 behavior to achieve benefits in the virtual world for real-world actions. The MOTIVATOR's 412 servers also may provide all or some of their stored data it has in its database 418 on participant such as grades, turning in homework, going to a gym, medical measurements, food choice, compliance with health or medical needs where Gameco's 104 servers 110 develop or record threshold levels of real-world activity or types of activity participant 402 needs to accomplish to earn virtual rewards. The actives may be very specific and targeted to even a single participant (e.g., participant 402) based on the goals set. One or more of the participant 402, MOTIVATOR 412, and Gameco 104 determine the desired activities and thresholds. A funding source 420, which may utilize the funding computing device (CD) 416 provides Gameco servers 110 a payment such as crypto currency or bitcoin, currency, debit card, credit card or linked bank account 450 to pay for or subsidize earned virtual reward.

Visa vie an application installed on the participant's 402 computing device, linked device or interaction of the participant 402 via a computing device with Gameco's 104 website and servers 110, the participant 402 receives notifications or reminders of activities he/she can perform in the real-world to earn virtual world benefits. The activities may be geo-linked, where if participant 402 is at the gym, a restaurant, a school, home, or work environment, he/she may receive a notification of activities he/she can act upon that are specific to the gym, restaurant, school, or home, or work environment.

The participant 402, when acting in the real-world 422, can meet threshold levels of activity or actions to earn benefits and virtual world rewards. In this example, activities include exercise 424, health food choices 426, medication compliance 428, chores 430, health data threshold's 452, trying on clothes or accessories 446, test driving or physical going to a vehicle 448. Some activities may be school related 432 and include grade or test or performance reports 434 at a threshold level, or kind acts (as reported or observed) 436 or turning in homework on time 438 or things like reading a book 440. Other actions or activities may be being employed at work 442, wherein the employee (participant 402) is on time, or does a good job, gets high customer satisfaction feedback, reaches high efficiency, high sales, low defects etc., and instead of getting an employee of the week button he/she will receive a virtual reward in the gaming environment which may also be subsidized or paid for by the employer. Motivation to achieve such benefits or rewards in the gaming world (virtual) are well defined for participants and by reinforcing this known behavior via preferred interactions act work or school the society benefits, brick and mortar retail may benefit and the opportunity for social interactions outside the virtual world are supported.

Other actions or activities may be a parolee or other institutionally monitored participant 444. Such as, the participant 402 may meet threshold levels of activity reported to Gameco 104 via the reporting servers 414 which might include meeting parole goals, sobriety, attending therapy, working, finishing education and the like then he/she will receive a virtual reward in the meta world which may also be subsidized or paid for by the institution or a sponsor. Motivation to achieve such rewards will reinforce behavior via preferred interactions at locations (i.e., first client location 316 and/or second client location 334).

Activities of the participant 402 is reported to Gameco servers 110 via the reporting server 414 via the network 106. If the Gameco servers 110 determine that participant's 402 activities have met the threshold level, then Gameco 104 can verify the funding/payment and notify participant 402 of the obtainment of a virtual reward.

In some instances, it may be preferred that the participant 402 is authenticated to Gameco servers 110 when he/she acts to provide participant 402 with a virtual world benefit for the behavior. A non-exclusive list of authentication means include voice recognition at a location via a server, facial recognition, other biometric authentication, verified with GPS and/or by participant interacting with check-in areas to capture a digital image or sound or code glyph, QR code and the like via participant's 402 computing device. Data collection devices can verify participant's 402 actions to the Gameco servers 110.

In these examples, Gameco 104 may be in signal communication with at least the first client 308 and the second client 310. In some instances, both the first client 308 and the second client 310 have Gameco 104 working to drive participants (i.e., participant 102/402) to the client's location 316 and 334, respectively. In this example the second client 310 real-world location 334 may be as large as a geographic region or as small as a store (336, 338, and 340) and the location(s) have servers (342, 344, and 346) which are in signal communications with the one or more servers 110 of Gameco 104 and the participant's 102 or 402 computing devices. In this example, online games provided by Gameco 104 may include online gambling as well as role pay and other games.

In an auction or competitive process wherein first client 308 and second client 310 are determined to be competing, Gameco 104 may direct a bidding or auction for time, date or location where Gameco 104 may limit for which client during what time it will act to motivate behavior through its online game.

It is appreciated by those skilled in the art that the circuits, components, modules, and/or devices of, or associated with, the system 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 5:
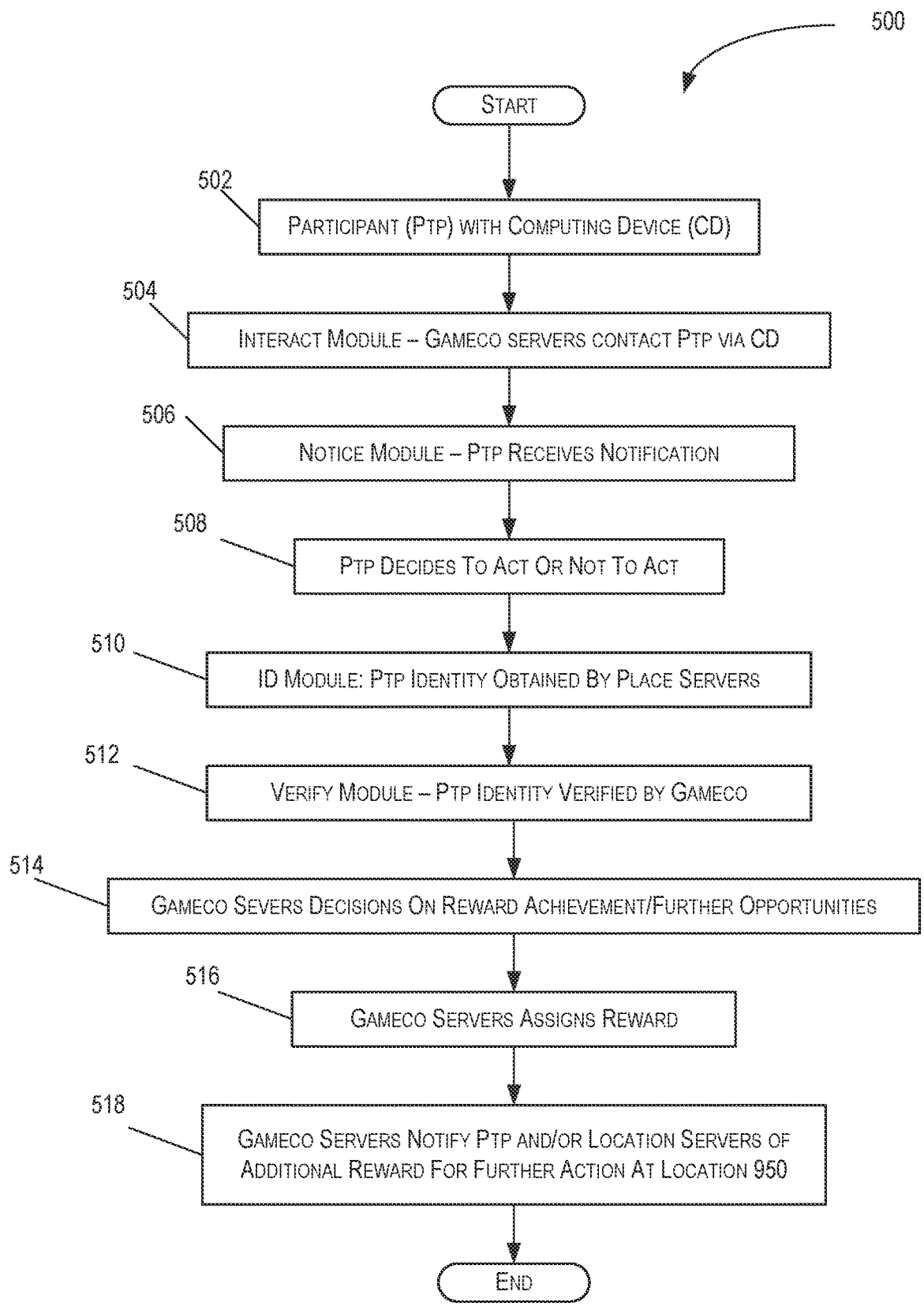
FIG. 5 is a flowchart is shown of an example of an implementation of a method utilized by the system shown in FIG. 1 is shown in accordance with the present disclosure.
Figure 6A:
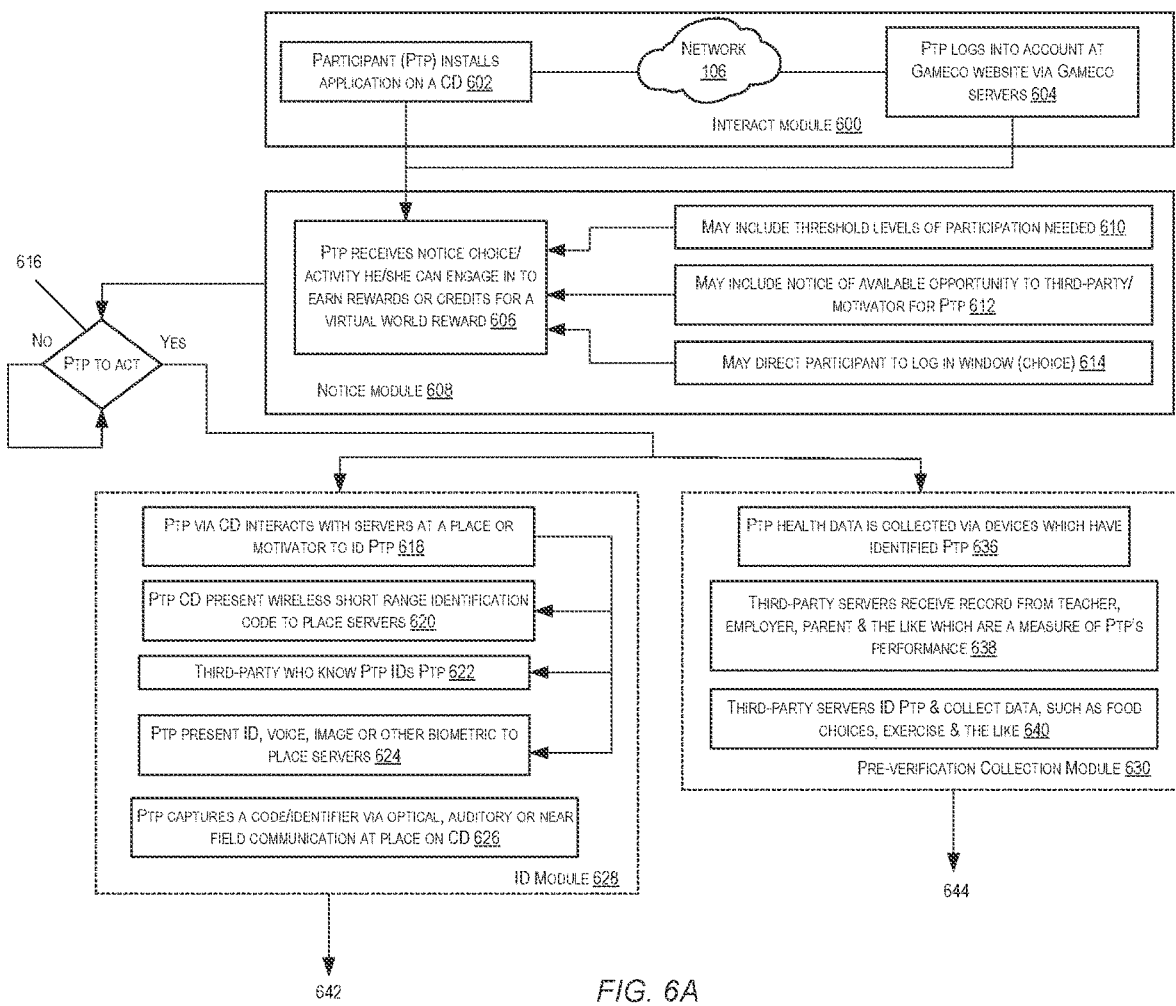
FIG. 6A is a partial functional system block diagram is shown of an example of an implementation of the functional steps of the method show in FIG. 5 in accordance with the present disclosure.
Figure 6B:
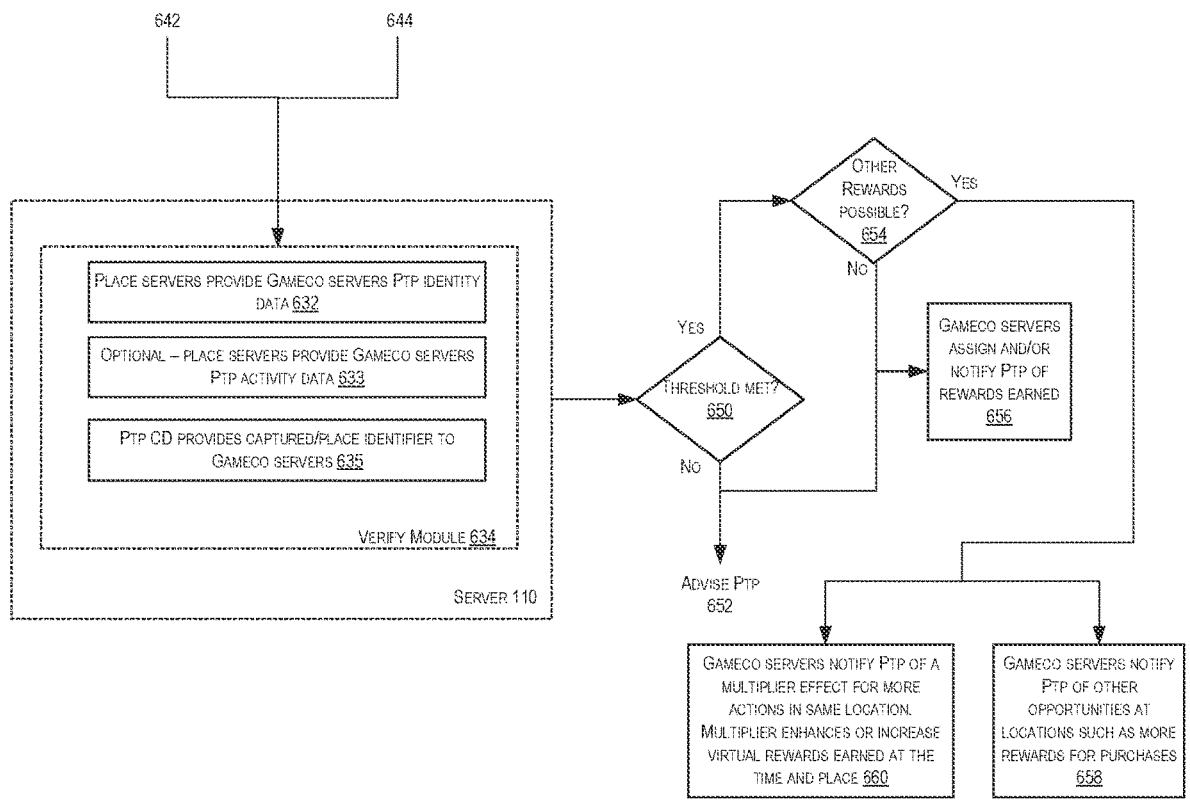
FIG. 6B is the remaining partial functional system block diagram of FIG. 6A.

In FIGS. 5-6B, flowcharts are shown for illustrating aspects of several methods and systems disclosed herein including process. Turning to FIG. 5, a flowchart is shown of an example of an implementation of a method 500 utilized by the system 100 is shown in accordance with the present disclosure.

The method starts 502 when the participant (Ptp) interacts 504 with Gameco servers 110 via the interaction (or communication) module. Via the interactions with Gameco servers 110, participant, visa vie the computing device, will receive notifications 506 (from a Notice module) of opportunities to earn virtual rewards via behavior in the real-world. The Gameco servers 110 may choose to provide connected opportunities wherein the push notification may be shared with designated person, via there computing devices, in accordance with agreements to have their conduct in the real-world help earn virtual world rewards to the participant. A non-limiting example may be a friend, spouse or parent travelling to the location and/or making purchases wherein the virtual benefit or reward is distributed to the participant.

A participant will decide 508 whether to act. If the participant acts and goes to the specified location, then via an identification (ID) module, the servers at the location (place—identify) 510 that the participant travelled to agglomerate/capture or receive ID information of participant. The place servers then provide the identification to the Gameco servers 110 which utilize a verification module to determine 512 if the participant is authenticated for the rewards sought. The Gameco servers 110 thereafter decide 514, applying rule and decision engines, on whether the reward requirements (which may include thresholds) have been met and whether and other opportunities exist at that location at that time.

If no other opportunities exist, then the Gameco servers 110 assign 516 reward. Gameco servers may also notify participant of the achievement. If additional opportunities for the identified and verified participant in or about the location, or on a route the participant is taking away from the location exist Gameco servers 110 may notify 518 participant and/or location servers of the opportunities. Additionally, opportunities may be purchasing goods or service at a client location. The method 500 then ends.

In some implementations, aspects include an interaction module where the participant becomes involved with the online game by one or more of installing or using an application on one of his/her computing devices and using the network 106 to interact with the Gameco servers 110 or logging on, with a computing device via a network 106, to Gameco's 104 website/servers 110.

Turning to FIG. 6A, a partial functional system block diagram is shown of an example of an implementation of the functional steps of the method 500 in accordance with the present disclosure. FIG. 6B is the remaining partial functional system block diagram of FIG. 6A.

In this example, an interaction module 600 includes the participant installing 602 a Gameco 104 application on the computing device of the participant. The participant then logs 604 into an account at the Gameco 104 website via the network 106 and the gameco servers 110.

Once the participant has become involved with the online Gameco 104, a database containing information about that participant is populated and updated by Gameco servers 110. Based on criteria set by Gameco servers 110, which may also be limited by participants assets, achievements while playing the online game(s), age, preference, physical location or other factors will receive one or more notifications 606 from a Gameco 104 notification module 608 (from Gameco servers 110) regarding a physical real-world location (i.e., 316 or 334) to be at to obtain a virtual reward. For Gameco 104, the locations (i.e., 316 or 334) represent locations of clients (i.e., 308 or 310) for who Gameco 104 is leveraging its online community and infrastructure to drive real-world traffic and or sales.

The notification module 608 may be a hardware component or software module that may be tailored to target specific participants based on criteria such as age, location, user preference, economic profile, virtual world activity or conduct, gender, habits, likes/dislikes, buddies, groupings and the like. The Gameco servers 110 select and/or filter a population of participants and notify them of opportunities. Optionally, participant may select an opportunity to advise Gameco servers 110 he/she is going to attempt to achieve the reward. The optional notice back from participant is useful for Gameco servers 110 to dynamically adjust the number of notifications it sends out in a given time frame. Additional rewards may be assigned to participants who respond with a notice back and who complete the real-world behavior.

Optionally, there may also be a requirement of a threshold level of participation for the participant to achieve a virtual reward for real-world activity and notice of same may be given 610. The threshold requirements may also be used as a criteria to filter out or identify participants who are more likely to be responsive to the notification and hence become a higher value participant for a particular response and/or for such a system and method.

Optionally, Gameco servers send or provide a virtual badge such as a specific or unique ID or code to a participant computing device for each opportunity 612 offered. If participant acts as intended by the motivation the participant earns the virtual badge such as an image, audio, or non-fungible token and the like. The virtual badge can be participant specific and therefore used to track participant actions in virtual world and the real world and therefore expand Gameco's 104 database on each participant to better select responsive populations. Optionally, Gameco servers 110 may push or notify a map application or navigation system which participant has specified or provided access to Gameco to with the location or directions to the location(s) 614.

Once notified, a participant has the opportunity to make a decision 616 to act in the real-world and go to a physical location (e.g., 318, 320, 322, 336, 338, or 340) and/or interact with servers (e.g., 324, 326, 328, 342, 344, or 346) at that location. Once a participant arrives at a location (318, 320, 322, 336, 338, or 340) the participant (or designee) needs to be identified to meet the opportunity requirements to achieve virtual rewards for real world conduct.

The participant interaction with place servers (324, 326, 328, 342, 344, or 346) to have participant or designee identified 618. Means of identification include but are not limited to participant's computing device present an RFID tag, or a wireless short range identification code to place servers 620. Participant presents a physical badge such as a bracelet or bracket with an RFID tag and/or a virtual badge containing specific information provided by Gameco servers 110 to participant computing device that identifies participant with respect to the opportunity 622. The participant may present his/her biometrics such as voice, image, breath, DNA, fingerprint, retinal scan and the like 624 to support identification.

Alternatively, the participant may establish reaching the real-world location via a code or identifier provided at the location 626. Such codes may be communicated to the participants computing device via short range signal communication wirelessly, or it may be captured by user via camera in computing device or speakers. Location codes may be auditory or visual or RF, the location may set up a screen that displays images or codes which can be captured and via time comparison of capture time and code provided Gameco servers 110 can decision if the participant is at the location at the designated time. ID data from the participants computing device known to Gameco servers 110 can also be part of the identification. In some instances, once the code establishing participant's action is communicated to Gameco servers 110. After the participant (or designee) has been identified at the location a verification procedure takes place where the Gameco servers one of receive the captured data associated with participant by place servers 632 or captured place (location) data is provided 635 by participants computing device to Gameco servers 110. Optionally, place servers may provide 633 participant activity data including but not limited to time at location, geographic movements at location, and purchases at location to Gameco servers 110.

In some instances, participant interacts with Gameco servers 110 via the interaction (or communication) module 600. Via the interactions with Gameco servers 110, participant, visa vie a computing device, will receive notifications (from the Notice module 608) of opportunities to earn virtual rewards via behavior in the real world. Opportunities may be dynamic and changing based on a location of participant or a set of criteria regarding choices, actions and the like participant or MOTIVATOR seeks to encourage. A participant will then decide whether or not to act 616. At this juncture, a participant may be identified via an ID module 628 or via a pre-verification module 630. If identified without pre-verification, then Gameco servers 110 perform an additional step to verify the participant via a verification module 634. The collected data about participant is transmitted 642 via computing device through the network to Gameco servers 110.

If the decision to act/choice is made and participant acts/chooses to agglomerate data of participant's actions or choices the pre-verification module 630 may be utilized. For example health data collection devices either on participant or which can identify participant and agglomerate data about participant actions (for example heart rate, blood pressure, blood sugar, breath, excretion, breathing, food choices, exercise and the like) collects data and/or choices 636. Third-party servers may receive records from a teacher, employer, parent and the like which are a measure of performance 638. The third-party servers may collect data, such as food choices, exercise and the like 640. The collected data about participant is transmitted 644 via computing device through the network to Gameco servers 110. If the participant fails to act in decision step 616, the process may repeat.

In some instances Gameco servers 110 after receiving the verification of participant connection with location data then decision if any necessary threshold(s) have been met 650. If not met then Gameco servers 110 contact 652 participant advising he/she of same. If threshold(s) are met Gameco servers 110 determine if additional rewards/benefits are available at or near the location 654. If no, then Gameco servers 110 award and/or notify participant of the virtual reward obtained 656. If other opportunities are available, Gameco servers 110 notify the participant of such opportunities 658. Gameco servers 110 may also notify participants of a multiplier effect for more actions in same location. A multiplier can, for a time or location or for a limited period, enhance or increase virtual rewards earned 660. For example, a participant at a location following a map through store aisles, museums, historical sights, events, attractions, and the like. In a real-world venue participant may complete a threshold action such as, but not limited to, selecting goods A versus goods B to try on or for purchase. In a different venue the participant may earn the reward by moving to each selection such as a painting, sculpture, beach, mountain top, stage, or pub.

Turning back to FIGS. 3 and 4 client(s) servers 312 and 330 are in signal communication with Gameco servers 110. For example, client servers (or client 308/310) contact Gameco 104 (or Gameco servers 110) and request that a notice be distributed to all or some of the population of participants 102. The notification includes at least one of location of opportunity, date of opportunity, and time of opportunity. The notice may further include threshold activity required. A threshold activity will change based on client needs and Gameco's 104 agreements.

A few non-limiting examples which in no way are intended to limit the scope of the inventions may include be at location for "X" minutes, or go to a specified department of a store at the location, or be at location between hours of "##:##" and "##:##", or find the yellow troll doll and take a picture of it next to a clock, or buy the "XYZ" subway sandwich and a large soda, or open a checking account at "ABC" bank.

Gameco 104 and clients (e.g., 308 and 310) may negotiate on the time(s) and location(s). Gameco 104 and clients agree on a value of one or more of participant notification and participant activity. The value may be reflected in virtual rewards which are awarded the participant and paid for or subsidized by client(s). Data of participant identification from the notice module 608 can be used to provide a count of the number of participant contacted. Notice back from participants may also be used as a measure of the initial response of participants to a particular opportunity. The raw data of notice back can later be compared to the actual activities of participants (data from the identification module 628) to further determine the return on investment (ROI) for clients who pay Gameco 104 for notification. The data may also be sued by Gameco 104 to refine the opportunity notice to achieve higher actions on the part of participants. The system 100 may can be dynamic and versatile. For example, if client has an excess of inventory of sandwiches or t-shirts at a location a notification may be limited to participant acquiring those goods. Alternatively, if a client location has a lull in foot traffic during a particular time frame the location (for example a big box retailer, amusement park or a mall) may offer rewards for the participant who traverses the location which may be verified with GPS and/or by participant interacting with check-in areas to capture a digital image or sound or code glyph, QR code and the like. In a Las Vegas type example, it may be the casinos visited, or hotels visited, or street attractions. In a theme park environment, it may be the rides at the park taken. In a winter resort, it may be the number of trails taken or the number of chair lift or gondola rides. On a hike or climb codes along the path can advance participant. Gameco servers 110 also verify participant activity. In some instance the participant is authenticated via a public digital ledger of past transactions or the like.

The disclosure presented herein may be considered in view of the following:

Clause A, a method to leverage a gaming infrastructure to encourage actions in a non-virtual environment to achieve virtual world benefits, the method comprising: participant interacts with Gameco servers via smartphone; Gameco servers provide participant opportunities to acquire virtual world benefits by visiting specific geographic locations in the non-virtual environment, which may include businesses; participant visits the specified geographical location; Gameco servers determine if a threshold level of action has been met; and participant is provided a virtual reward by Gameco, wherein verifying that the participant is participating includes confirming that the participant is performing the activity by at least one of the computing device of the participant, a computing devices of a client at the specific geographical location, or both. In some instances participant may earn the reward by moving to locations which are or will be represented in a Gameco virtual world. Examples include, but are not limited to, one or more particular paintings in a museum to create a virtual world gallery based on the real world visitations the reward being the virtual world representation of the paintings participant contacts with. The same process applies to items in a retail location a participant by contacting with goods to meet the threshold level can receive the virtual world representations of the goods as the reward. A more specific example includes merchandise such as shoes, dresses, jackets any article or clothing that the participant meets the threshold level of interaction to collect the article of clothing as a virtual reward. Another example is a concert if participant attends a concert in real world and has a seat location virtual world can populate that seat for participant in virtual world to attend said concert again or to allow participant to have a virtual world seat which may be sold, traded or bartered with other participants in virtual world.

Clause B, a method to leverage a gaming infrastructure to encourage actions in a non-virtual environment to achieve virtual world rewards or benefits, the method comprising: from time to time Gameco servers contact a participant, via participant's computing device, to notify the participant of an opportunity to achieve virtual rewards in a gaming environment or virtual world via visiting a specific geographical location in the non-virtual environment and performing some action in the non-virtual environment; participant is verified as participating; and Gameco servers determine if opportunity has been met and award virtual reward to participant, wherein verifying that the participant is participating includes confirming that the participant is performing the activity by at least one of the computing device of the participant, a computing devices of a client at the specific geographical location, or both.

the example of clause B, wherein verifying that the participant is participating includes the participant is identified at the specific geographical location via location servers.

Clause D, a method to leverage a gaming infrastructure to encourage actions in a non-virtual environment to achieve virtual world rewards or benefits, the method comprising: from time to time Gameco servers contact a participant, via the participant's computing device, to notify the participant of an opportunity to achieve virtual rewards in a gaming environment or virtual world via visiting a specific geographical location in the non-virtual environment and performing some action in the non-virtual environment; participant is verified as participating; Gameco servers determine if the opportunity has been met and award virtual reward to participant; Gameco servers determine that additional opportunities exist for a specific participant at or near the specific geographical location; and Gameco notifying participant of the opportunity.

Clause E, the example of clause D, further comprising Gameco servers contact client servers and request payment for virtual reward provided to participant.

Clause F, a method to leverage a gaming infrastructure to encourage actions in a non-virtual environment to achieve virtual world rewards or benefits, the method comprising: from time to time Gameco servers contact a participant via a computing device, to notify the participant of an opportunity to achieve virtual rewards in a gaming environment or virtual world via visiting a specific geographical location in the non-virtual environment and performing some action in the non-virtual environment; participant is verified as participating; Gameco servers determine if opportunity has been met and award virtual reward to participant; Gameco servers determining that additional opportunities exist for a specific participant at or near a specific geographical location; and Gameco notifies the specific participant of the opportunity.

Clause G, the example of clause F, further comprising Gameco servers verifies participant's additional opportunity activity.

Clause H, the example of clause G, further comprising Gameco servers contact client servers and request payment for virtual reward for participant's additional opportunity activity.

Clause I, the example of clause H, further comprising participant, via computing device, confirms to Gameco servers that participant will chose an opportunity to act, and Gameco servers record the confirmation.

Clause J, the example of clause I, wherein Gameco servers offer participant an enhanced or increased reward after the participant completes the activity, for confirming that the participant will chose an opportunity to act.

Clause K, a method to leverage a gaming infrastructure to encourage commercial purchases in a non-virtual environment, the method comprising: a client contacts Gameco and agrees on an offer of virtual world benefits or rewards to be awarded participants in an online game for performing activities in a real world; Gameco servers populate the offer via a notification to the computing devices of at least some of the participants in the online game, wherein the participant must perform the activity at a threshold level to obtain a reward in the virtual game world; client pays Gameco for providing the notification; and client subsidizes at least part of the costs of the virtual reward.

Clause L, the example of clause K, further comprising a Motivator in signal communication with Gameco servers identifies the activity and threshold level.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

If multiple clients seek the same population for notice that may be used to create an auction or bidding process wherein the client offering to provide more revenue to Gameco for virtual rewards which will be awarded to participants can compete for the notice. Optionally, the client may offer a greater subsidy of virtual goods thereby offering participant a greater reward visa vie Gameco.

Additionally, a client may offer a percentage of sales made to participants who have been notified by Gameco and who make purchases at location. Verification of the sale or purchase may be via linking the sale to the participant via participant computing device (which can self authenticate to Gameco) and/or via client server which interfaces with at least one of participant and participant's computing device to provide Gameco server adequate data to assign virtual reward to proper participant.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as an example implementations of such techniques.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Furthermore, the description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

It will also be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A method to leverage a gaming infrastructure to encourage actions in a non-virtual environment to achieve virtual world benefits, the method comprising:
   participant interacts with Gameco servers via smartphone;
   Gameco servers provide participant opportunities to acquire virtual world benefits by visiting specific geographic locations in the non-virtual environment, which may include businesses;
   participant visits the specified geographical location;
   Gameco servers determine if a threshold level of action has been met; and
   participant is provided a virtual reward by Gameco,
   wherein verifying that the participant is participating includes confirming that the participant is performing the activity by at least one of the computing device of the participant, a computing devices of a client at the specific geographical location, or both.

2. A method to leverage a gaming infrastructure to encourage actions in a non-virtual environment to achieve virtual world rewards or benefits, the method comprising:
   from time-to-time Gameco servers contact a participant, via participant's computing device, to notify the participant of an opportunity to achieve virtual rewards in a gaming environment or virtual world via visiting a specific geographical location in the non-virtual environment and performing some action in the non-virtual environment;

participant is verified as participating;

Gameco servers determine if opportunity has been met and award virtual reward to participant, wherein verifying that the participant is participating includes confirming that the participant is performing the activity by at least one of the computing device of the participant, a computing devices of a client at the specific geographical location, or both.

3. The method of claim 2, wherein verifying that the participant is participating includes the participant is identified at the specific geographical location via location servers.

4. The method of claim 3 wherein verifying the participation includes placement of a visual image or QR Code in the real world at the location which is unique to that location and or event; Graphic image could be placed so that a digital camera captures QR code and picture image and sends a code to Gameco's servers identifying the location and or the event.

5. The method of claim 4, the method further comprising Gameco servers electronically watermark an image taken with QR code information and at least one of time and geo location information.

6. The method of claim 5, the method further comprising Gameco servers insert the water marked image in virtual environment or a portion of a virtual environment and said water marked image is visible or displayed.

7. The method of claim 6, wherein the water marked image is only visible or displayed in the virtual environment or a portion thereof when the participant associated with the watermarked image is in the virtual environment or portion thereof.

8. The method of claim 6, wherein the water marked image is only visible or displayed in the virtual environment or a portion thereof for one of a fixed or variable time or date.

9. A system for leveraging a gaming infrastructure to encourage actions in a non-virtual environment to achieve virtual world benefits, the system comprising:

one or more processors configured to execute code;

a non-transitory computer-readable media storing instructions that, when executed by the one or more processors, cause the content server to perform operations comprising:

participant interacts with Gameco servers via smartphone;

Gameco servers provide participant opportunities to acquire virtual world benefits by visiting specific geographic locations in the non-virtual environment, which may include businesses;

participant visits the specified geographical location;

Gameco servers determine if a threshold level of action has been met; and participant is provided a virtual reward by Gameco, wherein verifying that the participant is participating includes confirming that the participant is performing the activity by at least one of the computing device of the participant, a computing devices of a client at the specific geographical location, or both.

* * * * *